United States Patent [19]

Howells

[11] 4,151,596
[45] Apr. 24, 1979

[54] CALCULATOR INTERFACE

[75] Inventor: Joseph A. Howells, Danbury, Conn.

[73] Assignee: Science Accessories Corp., Southport, Conn.

[21] Appl. No.: 836,366

[22] Filed: Sep. 26, 1977

[51] Int. Cl.² .................... G06F 3/00; G06F 15/02
[52] U.S. Cl. ............................ 364/709; 364/705; 364/900
[58] Field of Search ............... 364/561–564, 364/709, 200, 900, 705

[56] References Cited

U.S. PATENT DOCUMENTS

| | | | |
|---|---|---|---|
| 3,654,449 | 4/1972 | Boyce | 364/709 |
| 3,777,126 | 12/1973 | Hoff | 364/900 X |
| 3,895,356 | 7/1975 | Kraus | 364/562 X |
| 4,044,398 | 8/1977 | Yao | 364/709 X |
| 4,053,755 | 10/1977 | Sherrill | 364/561 |

Primary Examiner—Jerry Smith
Attorney, Agent, or Firm—Martin Novack

[57] ABSTRACT

The invention is applicable for use in conjunction with hand-held calculators, preferably of the type having a substantial computing and programming capability. The calculator typically has a housing, an input keyboard on the housing, a computing module in the housing which includes input terminals coupled to the keys of the keyboard, and a display coupled to the output of the computing module. In accordance with the invention, there is provided an interface for entering numeric information from a companion device, such as a graphical digitizer, into the computing module of the hand-held calculator. The interface includes a multipin connector element affixed to the housing of the calculator and a plurality of conductors for coupling the pins of the connector element to the input terminals of the computing module, these conductors being connected in parallel with the inputs from the keyboard. The interface further includes a multipin connector mate element, and a plurality of conductors coupled to the pins of the mate element and adapted for connection to the companion device. The calculator keyboard input to the computing module is typically a one-out-of-N input. The output of a typical graphical digitizer, however, is in binary coded form, with the digits of each binary word running from most-significant to least-significant positions. In the preferred embodiment of the invention, converter means are coupled between the graphical digitizer and the conductor mate element for converting the binary code to one-out-of-N form.

4 Claims, 2 Drawing Figures

CALCULATOR INTERFACE

BACKGROUND OF THE INVENTION

This invention relates to processing of digital information and, more particularly, to an improved interface for coupling numerical information, such as digital coordinate information, into a hand-held calculator.

In recent years hand-held calculators have come into widespread use. Advances in integrated circuit and microcircuit technology have reduced the cost of calculators having substantial computing and programming ability to the point where technical personnel have such calculators available for individual use. The availability of these calculators has enhanced the efficiency of technical personnel since, for many types of calculations, it is no longer necessary to wait for the availability of larger non-portable computers. However, there are certain aspects of using hand-held calculators which are quite limiting on efficiency. For example, when numerical information is being generated by another device, it is necessary for the user of a hand-held calculator to read the information generated by the companion device and then manually enter the numerical information into the hand-held calculator via the calculator keyboard. One instance where this procedure might be followed is where a hand-held calculator is used to store data and perform calculations on numerical information generated by a graphical digitizer which produces digital information, generally in a binary coded form, representative of the instantaneous position of a movable element such as a stylus or cursor. In such case, the necessity of having an operator read output information from the graphical digitizer and manually enter such information into a calculator via its keyboard is a relatively slow and inefficient process. Also, this procedure increases the possibility of human error which can arise from a misreading of data or mistakes in the keyboard entry process.

It is an object of the present invention to provide solution to the problem inherent in the prior art as set forth.

SUMMARY OF THE INVENTION

The present invention is applicable for use in conjunction with hand-held calculators, preferably of the type having a substantial computing and programming capability. The calculator typically has a housing, an input keyboard on the housing, a computing module in the housing which includes input terminals coupled to the keys of the keyboard, and a display coupled to the output of the computing module. In accordance with the invention, there is provided an interface for entering numeric information from a companion device, such as a graphical digitizer, into the computing module of the hand-held calculator. The interface includes a multipin connector element affixed to the housing of the calculator and a plurality of conductors for coupling the pins of the connector element to the input terminals of the computing module, these conductors being connected in parallel with the inputs from the keyboard. The interface further includes a multipin connector mate element, and a plurality of conductors coupled to the pins of the mate element and adapted for connection to the companion device.

The calculator keyboard input to the computing module is typically a one-out-of-N input. The output of a typical graphical digitizer, however, is in binary coded form (such as binary or binary coded decimal) with the digits of each binary word running from most-significant to least-significant positions. In the preferred embodiment of the invention, converter means are coupled between the graphical digitizer and the conductor mate element for converting the digitizer output to one-out-of-N form.

Further features and advantages of the invention will become more readily apparent from the following detailed description when taken in conjunction with the accompanying drawings.

DESCRIPTION OF THE PREFERRED EMBODIMENT

Figure 1:
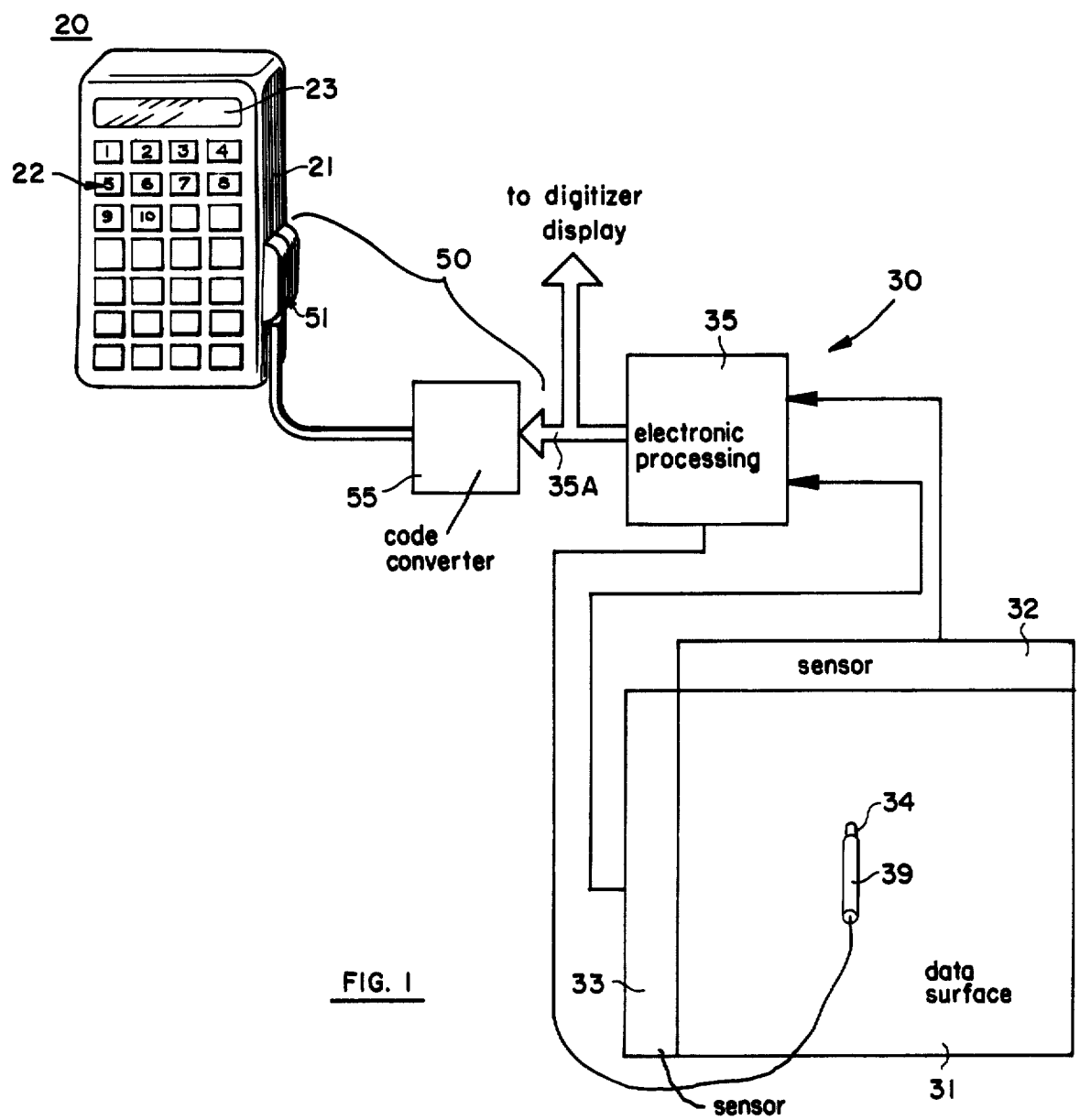
FIG. 1 illustrates the interface of the invention, as being used in conjunction with a hand-held calculator and a graphical digitizer.
Figure 2:
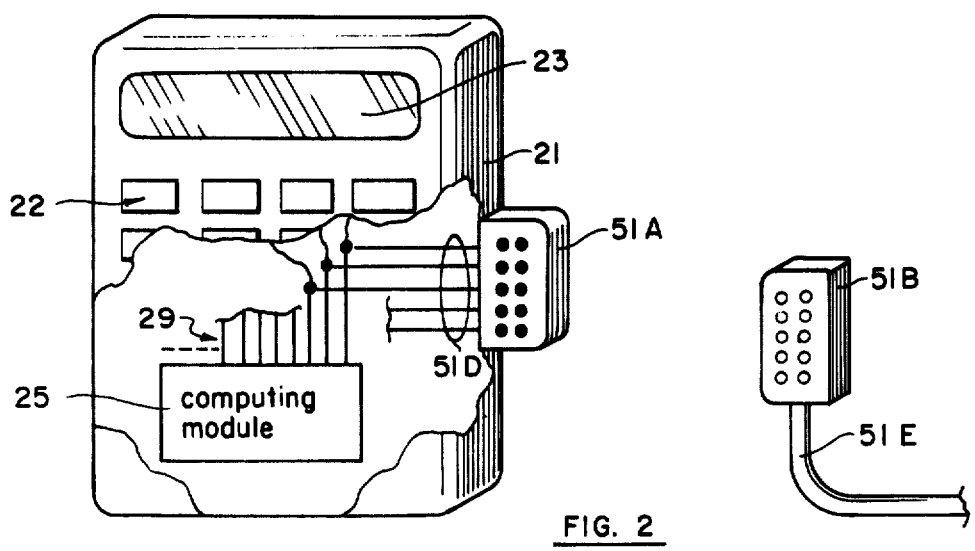
FIG. 2 shows a portion of the arrangement of FIG. 1, with part of the hand-held calculator being shown in cutaway form for a better understanding of the interface in accordance with the invention.

Referring to FIG. 1, there is shown a hand-held calculator 20, a graphical digitizer device 30, and the external portions of an interface 50 (within the bracket) in accordance with the invention. The hand-held calculator may be of any suitable type, and preferably has a substantial information storage and computing capability, such as the model SR-59 manufactured by Texas Instruments Corp. The graphical digitizer may be of the type manufactured by Science Accessories Corp. of Southport, Conn., for example the "graf/pen" model GP-3. The calculator 20 includes a housing 21 which has a keyboard 22 and a display 23 thereon. Within housing 21 is a computing module 25 which can be seen in the cutaway view of FIG. 2. The keyboard contacts are coupled to input terminals of the computing module 25, as illustrated by the representative lines 29 in FIG. 2. Typically, the numerical inputs from the keyboard are in a one-out-of-N format.

The graphical digitizer 30 typically includes a data surface 31, sensors 32 and 33, and a source of wave energy 34 at the tip of a stylus or cursor 39. In the "graf/pen" model GP-3 digitizer of Science Accessories Corp., the sensors 32 and 33 are elongated microphones, and the stylus tip emits periodic sound wave pulses. The outputs of the microphones 32 and 33 are coupled to the electronic processing portion 35 of the graphic digitizer which also includes the timing that controls generation of the periodic sound wave pulses. In this type of graphical digitizer, the propagation time of the sound wave front from its source to each of the two elongated microphones is measured and resultant digital signals, on an output cable 35A, are representative of the position of the stylus or cursor on the data surface. The output 35A of the processing circuitry 35 is typically in binary coded form with each of the x and y coordinates being represented by a digital word consisting of bits in conventional most-significant to least-significant order. The output of the processing circuitry 35, in this digital form, is typically coupled to a display unit (not shown) and also made available for coupling to other equipment, for example, a computer.

In accordance with the present invention, there is provided a connector element 51A, of a connector 51, which is affixed to the side of the housing 21 of hand-held calculator 20. This connector element may be either the plug or socket portion of connector 51, the element 51A of the present embodiment being a plug portion. The connector may be any suitable small multipin connector, such as the model Mini-PV manufactured by Berg Electronics Corp., and can be affixed to the housing of the hand-held calculator by any suitable technique, such as by use of an epoxy resin. Alternatively, the connector element 51A may be formed integrally with the housing of the hand-held calculator 20. The pins of connector element 51A are coupled, via lines 51D to the input terminals of computing module 25. The socket element 51B of connector 51 has N socket pins which are coupled via cable 51E to the output of a code converter 55 which is part of the interface 50 in the present embodiment. The code converter, which may be of the type manufactured by Texas Instruments, such as their model SN 5442, converts the information from graphical digitizer 30 into one-out-of-N form that can be utilized by the hand-held calculator 20. The converter 55 can, if desired, be housed within the electronic processing circuitry 35 of the graphical digitizer 30.

In operation, the calculator 20 can be utilized in a conventional manner with the connector socket element 51B disconnected therefrom. When it is desired to input information from the companion device, such as the graphic digitizer 30, the connector socket element 51B is mated to the connector plug element 51A. Typically, if the calculator is of the programmable type, a suitable program will first be entered to prepare for entry of the graphical digital information.

The invention has been described with reference to a particular embodiment, but variations within the spirit and scope of the invention will occur to those skilled in the art. For example, it will be understood that if either the hand-held calculator or the companion device has a different coding arrangement, that suitable modifications in the coupling of these units can be implemented.

I claim:

1. For use in conjunction with a hand-held calculator having a housing, an input keyboard on said housing, a computing module in said housing including input terminals coupled to the keys of the keyboard, and a display on said housing coupled to the output of the computing module; an interface of entering numeric information from an independent companion device into the computing module while maintaining full portability and independent use of said calculator, comprising:
    a multipin connector element affixed to the housing of said calculator;
    a plurality of conductors for directly coupling pins of said connector element to the numerical input terminals of the computing module, said conductors being connected in parallel with the inputs from said keyboard;
    a multipin connector mate element; and
    a plurality of conductors coupled to the pins of said mate element and adapted for connection to said independent companion device.

2. The interface as defined by claim 1 wherein said calculator keyboard input is a one-out-of-N input and said device for generating numerical information generates said information in a binary coded form, and further comprising converter means coupled between said device and the conductors coupled to said connector mate element for converting the binary code to one-out-of-N form.

3. For use in conjunction with a hand-held calculator having a housing, an input keyboard on said housing, a computing module in said housing including input terminals coupled to the keys of the keyboard, and a display on said housing coupled to the output of the computing module; an interface for entering numeric information from an independent graphical digitizer into the computing module while maintaining full portability and independent use of said calculator, comprising:
    a multipin connector element affixed to the housing of said calculator;
    a plurality of conductors for directly coupling pins of said connector element to the numerical input terminals of the computing module, said conductors being connected in parallel with the inputs from said keyboard;
    a multipin connector mate element; and
    a plurality of conductors coupled to the pins of said mate element and adapted for connection to said independent graphical digitizer.

4. The interface as defined by claim 3 wherein said calculator keyboard input is a one-out-of-N input and said graphical digitizer generates information in binary coded form, and further comprising converter means coupled between said graphical digitizer and the conductors coupled to said connector mate element for converting the binary code to one-out-of-N form.

* * * * *